United States Patent [19]

Sugitani et al.

[11] Patent Number: 4,926,023

[45] Date of Patent: May 15, 1990

[54] HIGH-SPEED ROTATIVE ARC WELDING DEVICE

[75] Inventors: Yuji Sugitani; Yukio Kobayashi, both of Tsu; Yoshihisa Ikeda, Kameyama; Masatoshi Murayama, Hisai, all of Japan

[73] Assignee: Nippon Kokan Kabushiki Kaisha, Tokyo, Japan

[21] Appl. No.: 295,039

[22] PCT Filed: Apr. 24, 1987

[86] PCT No.: PCT/JP87/00262

§ 371 Date: Dec. 21, 1988

§ 102(e) Date: Dec. 21, 1988

[87] PCT Pub. No.: WO88/08352

PCT Pub. Date: Nov. 3, 1988

[51] Int. Cl.$^5$ ................................................. B23K 9/12
[52] U.S. Cl. ................................................. 219/125.12
[58] Field of Search ..................................... 219/125.12

[56] References Cited

U.S. PATENT DOCUMENTS 3,396,263  8/1968  Even et al. ............... 219/125.12
4,047,656  9/1977  McCombs .................. 219/125.12
4,401,878  8/1983  Roen ......................... 219/125.12

FOREIGN PATENT DOCUMENTS 53-102850  9/1978  Japan ...................... 219/125.12
125635     5/1959  U.S.S.R. ................. 219/125.12
965664    10/1982  U.S.S.R. ................. 219/125.12

Primary Examiner—Clifford C. Shaw
Attorney, Agent, or Firm—Michael N. Meller

[57] ABSTRACT

This invention relates to a rotational arc welding machine that gives a rotational circular motion to arc generated from an electrode. The machine supports rotatably an electrode (20) at a predetermined distance (d) from the center of a disc (25) which makes a rotational circular motion and at the same time supports said electrode at the upper part thereof as the supporting point therefor, causing the arc generated from said electrode to make a rotational circular motion by rotating said disc. Accordingly, in the said machine, even though the lower part of the electrode makes a circular motion, the electrode itself does not rotate; therefore, electricity can be directly supplied to the electrode.

4 Claims, 2 Drawing Sheets (A)

(B)

HIGH-SPEED ROTATIVE ARC WELDING DEVICE

TECHNICAL FIELD

This invention relates to a high-speed transfer arc welding device for performing a welding operation while causing a high-speed rotation of the welding arc.

BACKGROUND ART

The present inventors have proposed a rotative arc welding device (Japanese laid-Open Publication No. 58-176073) which has given rise to many useful results by application to a narrow-groove welding. According to this welding device, the high-speed rotation of the welding arc promotes penetration at the side wall of the groove while also producing a concave bead shape suitable for multi-layer welding. The result is the significantly improved quality of the narrow groove welding. This welding device is hereafter referred to as the conventional welding device.

This conventional welding device has a vertically oriented rotary nozzle to the end of which is attached a tip having a wire supply opening offset from the axis outwardly, a power receiving plate secured to the upper end of the rotary nozzle and having a center wire inserting opening, a carbon brush the lower surface of which slides on the upper surface of said power receiving plate, a power supply plate secured to the upper surface of said carbon brush, and a wire inlet the lower end of which is passed through said power supply plate and said carbon brush so as to face to the upper surface of the wire inserting opening in said power receiving plate and having a wire insertion opening at the center attached to a supporting arm in turn extended from the main body of the device. The conventional welding device further includes a guide rod, the lower end of which is suspendedly mounted to said supporting arm is fitted into guide apertures in the power supply plate and in the carbon brush, a resilient member for pressing towards the power receiving plate the carbon brush which is fitted to the periphery of the guide rod and carrying the power supply plate, a wire feeder for feeding the welding wire through the wire inlet to the rotary nozzle, and a pair of shield gas nozzles provided on both sides of the rotative nozzle with its open side directing towards the end of the rotative nozzle.

The welding device of this type is shown schematically in FIG. 2. In the drawing, the numeral 1 denotes a gear box, the numeral 2 an electric motor, the numeral 3 an electrode, the npmeral 4 a wire inlet, the numeral 5 a shield gas nozzle base block, the numeral 6 a shield gas nozzle, the numeral 7 a wire feeder, the numeral 8 a welding wire, the numeral 9 a roller, the numeral 10 a wire feeding electric motor, the numeral 11 a power receiving plate, the numeral 12 a carbon brush, the numeral 13 a power supplying plate, the numeral 14 a guide plate, the numeral 15 a guide rod, the numeral 15 a spring, the numeral 16 a power supply cable, the numeral 17 a current supply cable terminal attachment opening, the numeral 18 a supporting arm and the numeral 19 a rotary postion sensor.

The above described welding device makes use of the carbon brush 12 for power supply since the electrode 3 itself is rotated. Thus the contact area for the carbon brush 12 must be procured for assuring a current supply capacity, while the rotative contact resistance of the carbon brush 12 need be considered, so that the current supply section or the electrical motor 2 is necessarily increased in size. This, however, has proved to be a hindrance when it is required to reduce the size of the welding device.

DISCLOSURE OF THE INVENTION

It is an object of the present invention to provide a high speed rotative arc welding device in which the rotative system for the electrode is improved in order to provide for reduction in size and weight without sacrificing the advantages of the prior-art welding device.

According to the high-speed rotative arc welding device of the present invention, the electrode is rotatively supported with an offset of a predetermined distance from the center of a disk performing a rotative movement, and the disk is driven into rotation with the upper portion of the electrode as the supporting point, so that the arc emitted by the electrode is caused to perform a rotative circular movement.

In such manner, in accordance with the present invention, the electrode itself is not rotated when the lower end of the electrode performs a circular movement. It is therefore possible to supply the power directly to the electrode.

Therefore, with the high-speed rotative arc welding device of the present invention, as compared with the conventional rotative arc welding device, the following outstanding results may be achieved.

(a) In the conventional welding device, the space for the supply section is increased, because the power supply is through a contact power supply system with the aid of a carbon brush. On the other hand, a large-sized rotating electrical motor is required because of the contact resistance of the carbon brush.

Conversely, in the welding device of the present invention, since the power can be supplied directly to the electrode nozzle, the space necessary for the power supply section is considerably reduced. Also, since there is no contact resistance of the carbon brush, a small-sized electric motor can be used more extensively than heretofore so that the welding device may be significantly reduced in size and weight.

(b) In the conventional welding device, the electrode itself is driven into rotation. In the welding device of the present invention, it is only the lower end of the electrode nozzle that performs a rotative movement, while the electrode nozzle itself is not rotated. In such manner, the electrode nozzle can be cooled with water easily, while it becomes possible to make a more extensive application of the present welding device.

BEST MODE FOR WORKING THE INVENTION

Figure 1:
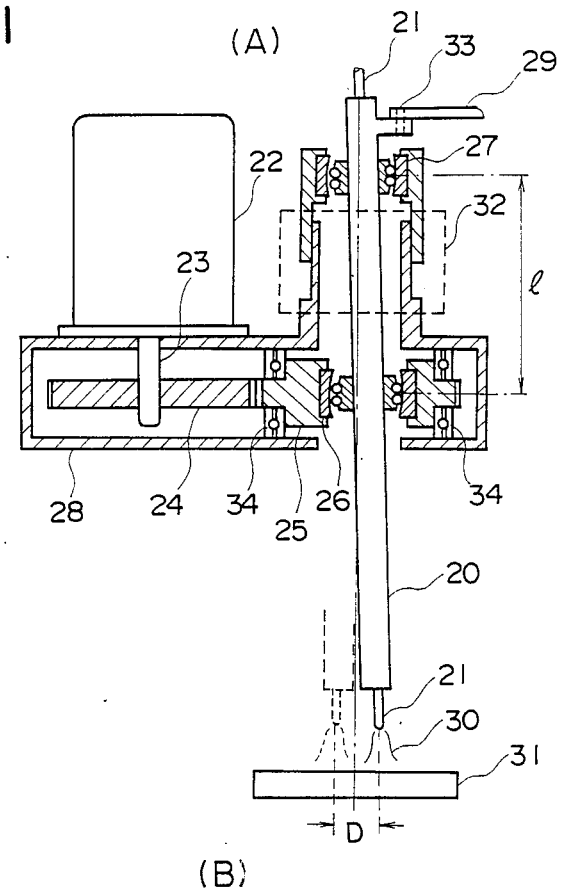
FIGS. 1(A) and (B) are a cross-sectional side view showing a rotative arc welding device according to a preferred embodiment of the present invention, and a plan view of a gear section for transmitting rotative movement to the lower end of the electrode.
Figure 1:
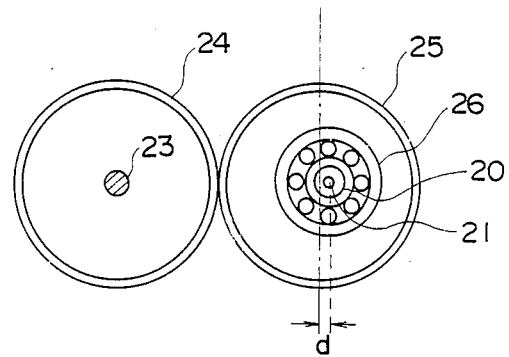
Figure 2:
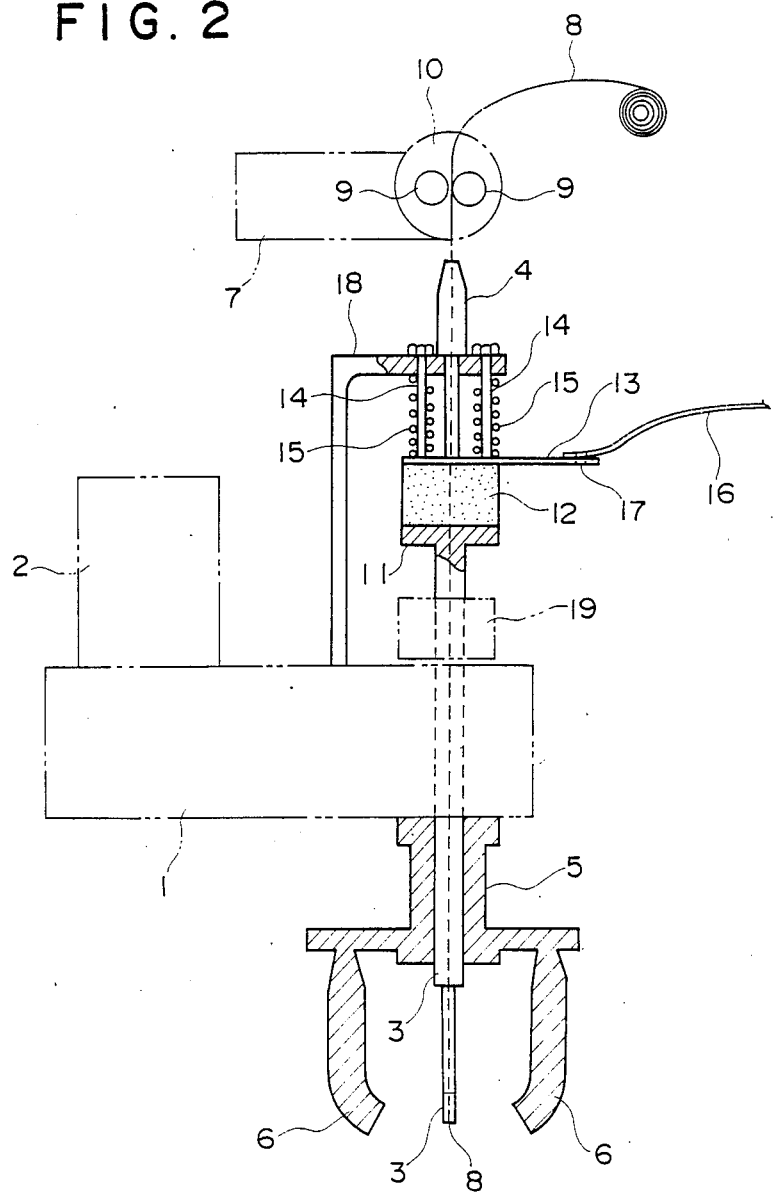
FIG. 2 is a schematic cross-sectional side view showing the conventional rotative arc welding device.

A preferred embodiment of the present invention will be described by referring to the drawings.

FIGS. 1(A) and (B) are cross-sectional side views of a rotational arc welding device according to a preferred embodiment of the present invention and a plan view showing a gearing unit for imparting a rotative motion to the electrode.

Referring to FIG. 1, the numeral 20 denotes an electrode, the numeral 21 a welding wire, the numeral 22 a rotary electric motor, the numeral 23 a shaft of the motor 22, and the numeral 24 a gear secured to the shaft 23 and excited into a high-speed rotation by the motor 22, and the numeral 25 a gear excited into a high-speed rotation by the gear 24. The numeral 26 denotes a self-aligning bearing adapted for supporting the electrode 21 and attached to the gear 25 with an offset of a predetermined distance d from the center of the gear 25 so that the electrode 21 will be rotated at an elevated speed by rotation of the gear 25. The numeral 27 denotes a self-aligning bearing acting as a supporting point for the rotating electrode 21. The numeral 28 denotes a gear box attached to a rack of a welding dolly, not shown. The numeral 29 denotes a power supply cable for supplying an electrical power to the electrode. The numeral 30 denotes a welding arc, the numeral 31 a work to be welded and the numeral 32 an adjustment unit for adjusting the rotative diameter. The numeral 33 denotes an attachment opening for a power supply cable terminal and the numeral 34 a bearing for supporting the gear 25.

The lower end of the electrode 21 is excited into a rotative movement through the gear 24 by the motor 22 with the self-aligning bearing 27 as a support point. In this manner, the welding arc 30 and the foremost part of the welding wire 21 supplied at the lower extremity of the electrode 20 perform a rotative circular motion on the work 31. The diameter of rotation D at the end of the rotating welding wire 21 may be adjusted by changing the distance at the adjustment unit 32. Since the electrode 20 itself is not turned when the lower end of the electrode 20 performs a rotative movement, it is possible to supply the current directly to the electrode 20 through the feeder 29 as shown.

It will be noted that FIGS. 1(A) and (B) merely illustrate a preferred embodiment of the present invention without limiting the present invention to such specific embodiment. For example, the self-aligning bearing 27 used as the fulcrum or supporting point for the electrode 20 may be replaced by a spherical bearing since the movement of the portion of the electrode 20 is small. Also it is to be noted that any other transmission system than the gear shown in the above embodiment may be used as the transmission system from the motor 22 to the gear 25. The welding method to which the present invention is applied is the welding method as a whole.

We claim:

1. A rotative arc welding device comprising:
   first supporting means for supporting an upper portion of an electrode as the supporting point of a circular conical motion;
   second supporting means for supporting a middle portion of said electrode with an offset of a predetermined distance from a center of a disk;
   driving means for driving said second supporting means to make a lower end of said electrode travel in a circular orbit; and
   adjusting means for adjusting the distance between said first supporting mens and said second supporting means, thereby adjusting the diameter of said circular orbit of the electrode.

2. A rotative arc welding device according to claim 1 wherein the upper portion of the electrode is supported by a self-aligning bearing.

3. A rotative arc welding device according to claim 1 wherein the upper portion of the electrode is supported by a spherical bearing.

4. A rotative arc welding device according to claim 1, wherein the center portion of the electrode is supported by a self-aligning bearing and said driving means comprising a rotatively driven gear, said self-aligning bearing being mounted on said gear with an offset of a predetermined distance from the center of said gear.

* * * * *